M. GREBNER.
Wire Cages.

No. 139,784.

Patented June 10, 1873.

Witnesses.
Ernst Bilhuber.
E. F. Kastenhuber.

Inventor.
Michael Grebner
Van Santvoord & Hauff
Attys

UNITED STATES PATENT OFFICE.

MICHAEL GREBNER, OF NEW YORK, N. Y.

IMPROVEMENT IN WIRE-CAGES.

Specification forming part of Letters Patent No. 139,784, dated June 10, 1873; application filed January 31, 1873.

*To all whom it may concern:*

Be it known that I, MICHAEL GREBNER, of the city, county, and State of New York, have invented a new and useful Improvement in Animal-Cages; and I do hereby declare the following to be a full, clear, and exact description thereof, which will enable those skilled in the art to make and use the same, reference being had to the accompanying drawing forming part of this specification, in which drawing—

Figure 1:
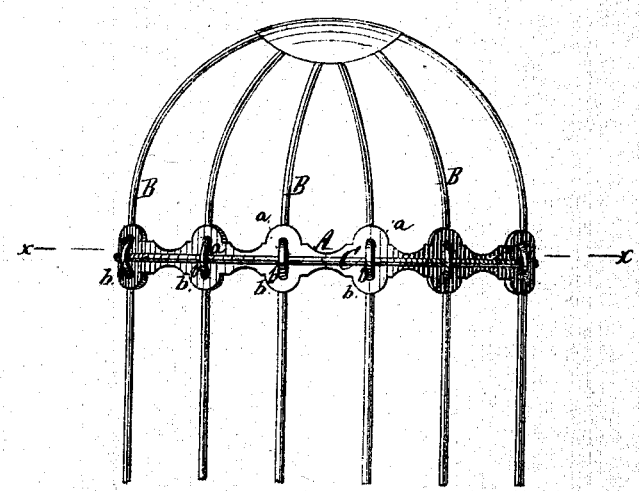
Figure 2:
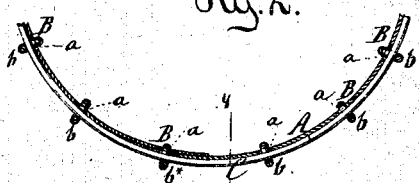
Figure 3:

Figure 1 represents a front view of this invention. Fig. 2 is a horizontal section of the same in the plane $x\,x$, Fig. 1. Fig. 3 is a transverse section of the same in the plane $y\,y$, Fig. 2.

Similar letters indicate corresponding parts.

This invention consists in cross-bands provided with slots or eyes to receive loops which are formed on the filling-wires, in combination with a locking-bar, in such a manner that by adjusting the loops of the filling-wires in the eyes of the cross-bands and inserting the locking-bar a firm and durable connection between the filling-wires and the cross-bands is effected without the use of solder, and a cage is obtained which can be cheaply manufactured and is not liable to break.

In the drawing, the letter A designates one of the cross-bands of my cage. This cross-band is stamped or otherwise produced of sheet metal, and it is provided with a series of slots or eyes, $a$, at uniform distances apart. These eyes are intended to receive loops $b$ which are formed in the filling-wires B, and after these loops have been adjusted in the eyes of the cross-band a locking-bar, C, is passed through the same, and thereby the cross-band and the filling-wires are firmly connected. The ends of each cross-band are made to overlap each other, and one of the loops, $b^*$, Fig. 2, is passed through two eyes near the ends of the cross-band, so that when the locking-bar is passed through the loops the ends of the cross-band are firmly retained in position without solder. The ends of the locking-bar C are cut off so that the same will meet closely on the circumference of the cross-band, and by slight blows upon the loops of the filling-wire next to the ends of the locking-bar said ends are prevented from slipping back and a firm connection between the cross-bands, the filling-wires, and the locking-bar is effected without the use of solder.

By preparing proper tools for the production of the cross-bands with their eyes, and of the filling-wires with their loops, my cage can be manufactured very cheap, and since no solder is required in its manufacture I am enabled to expose the cage after it is ready to a great heat, which may be desirable for the production of an enameled cage. It must be remarked, however, that the ends of the locking-bar might be secured in position by solder. The cross-band might also be made in sections, and in this case the locking-bar would have to be clamped in each of the loops of the filling-wire.

It is obvious that this invention is applicable to cages for squirrels or other animals besides birds.

What I claim as new, and desire to secure by Letters Patent, is—

A cage, the cross-bands of which are provided with eyes for the reception of loops formed on the filling-wires, said cross-bands and filling-wires being held together by a locking-bar passing through the loops of the filling-wires, substantially in the manner herein shown and described.

This specification signed by me this 22d day of January, 1873.

M. GREBNER.

Witnesses:
W. HAUFF,
E. F. KASTENHUBER.